April 19, 1932.     H. T. AVERY     1,854,391
AUTOMATIC NAVIGATOR
Filed Oct. 24, 1927     8 Sheets-Sheet 5
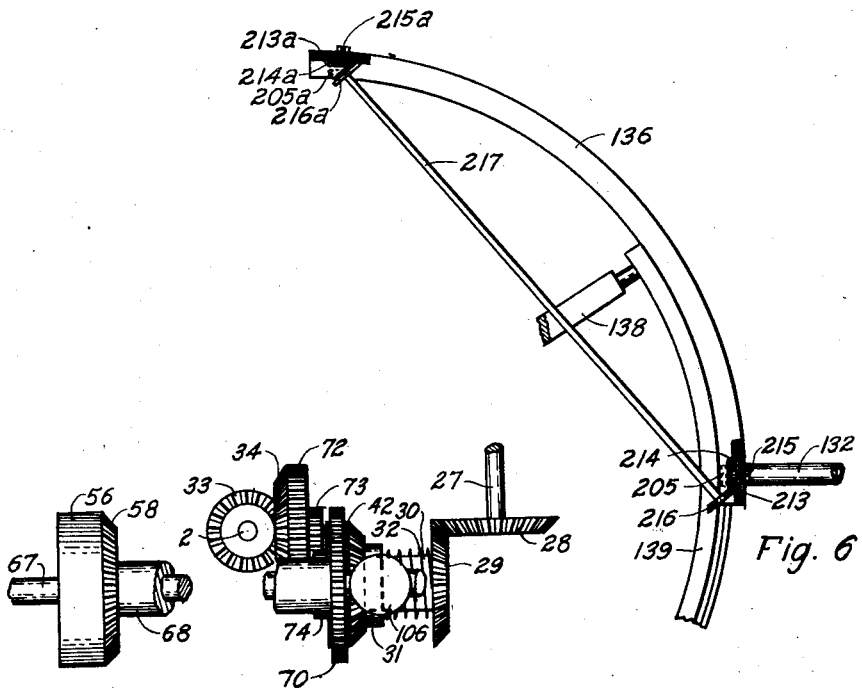
Fig. 6
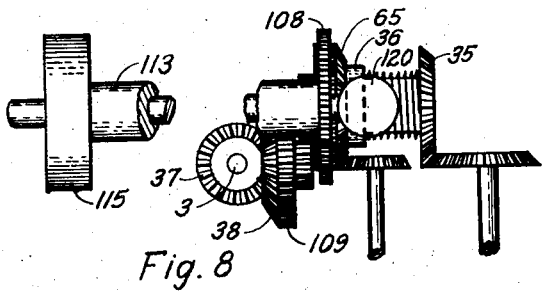
Fig. 7
Fig. 8
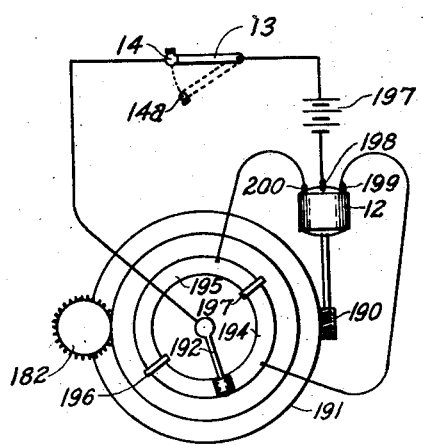
Fig. 10
Inventor:
Harold T. Avery April 19, 1932.  H. T. AVERY  1,854,391
AUTOMATIC NAVIGATOR
Filed Oct. 24, 1927  8 Sheets-Sheet 7
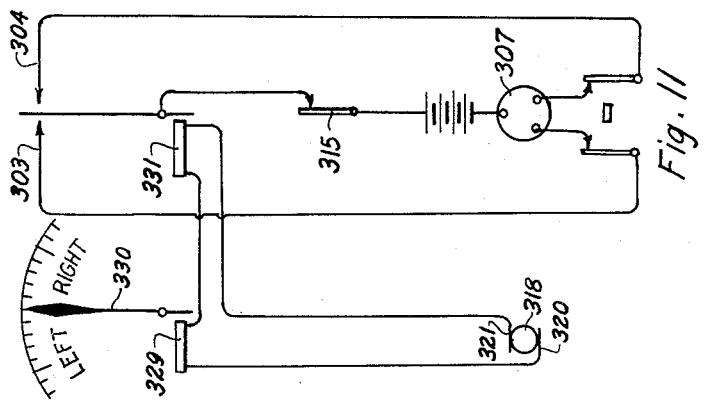
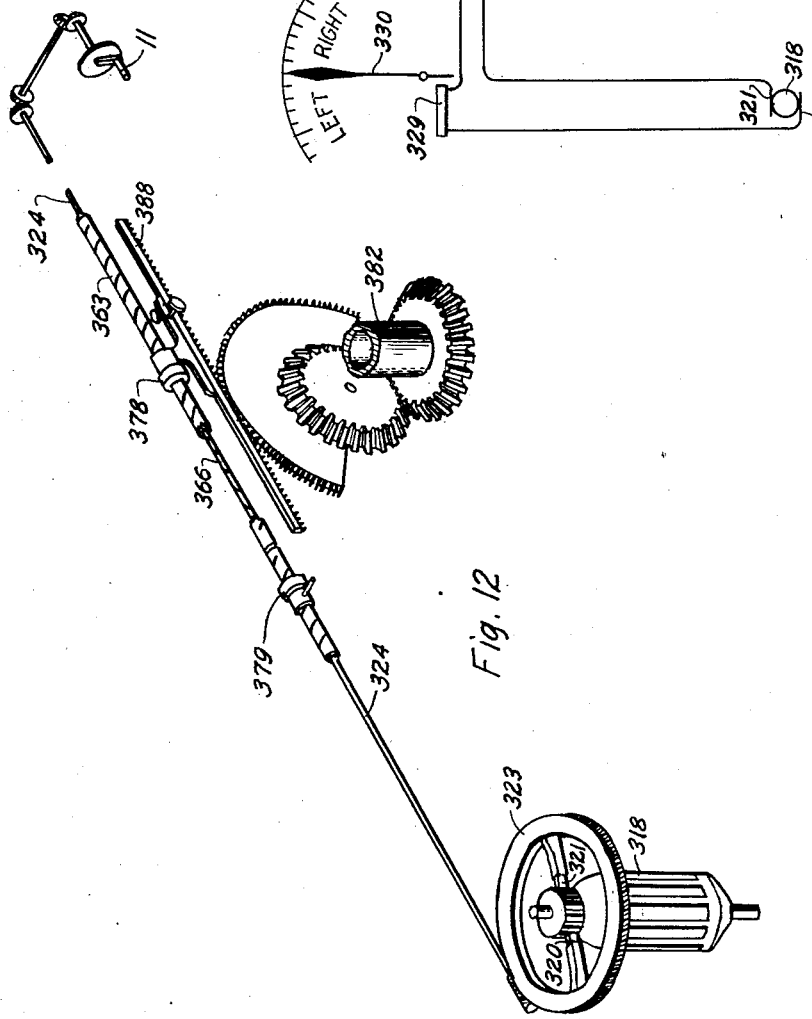
Inventor:
Harold T. Avery April 19, 1932. H. T. AVERY 1,854,391
AUTOMATIC NAVIGATOR
Filed Oct. 24, 1927 8 Sheets-Sheet 8

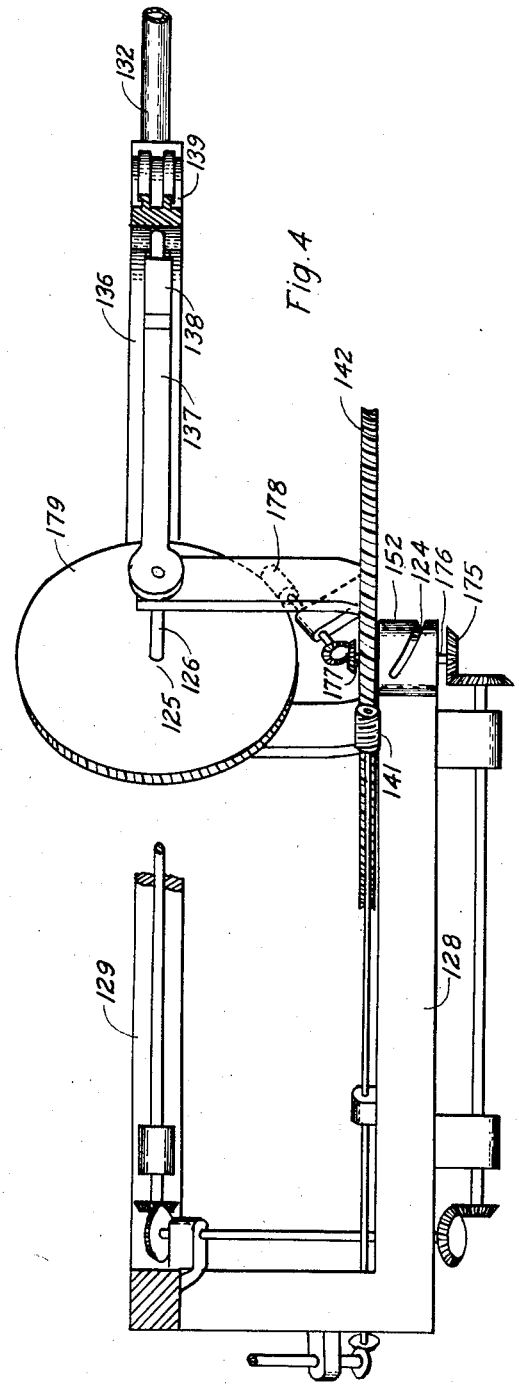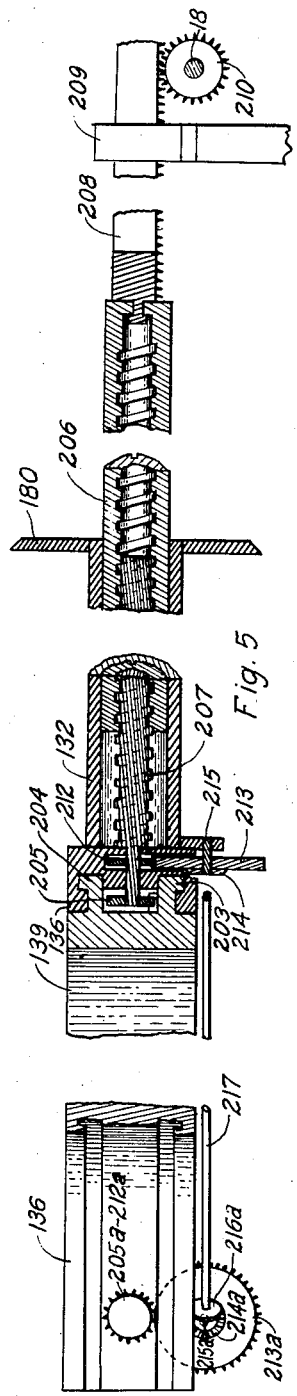

Inventor:
Harold T. Avery

Patented Apr. 19, 1932

1,854,391

UNITED STATES PATENT OFFICE

HAROLD T. AVERY, OF SAN LUIS OBISPO, CALIFORNIA

AUTOMATIC NAVIGATOR

Application filed October 24, 1927. Serial No. 228,314.

This invention relates to a device adapted to automatically perform the computations ordinarily incident to the navigation of a dirigible vehicle, and to automatically use the results thus computed to control the direction of movement of the vehicle.

The objects of this invention are:

1. The provision of means for automatically computing the course and distance of the most direct path from a given position on the surface of the earth to any other point on the surface of the earth.

2. The provision of means for automatically steering a vehicle to its desired destination.

3. The provision of means for automatically registering the distance of the vehicle from such destination.

4. The provision of means adapted to automatically steer a vehicle from one point to another along the great circle joining the two points, the course being automatically varied throughout in such a manner as to keep the vehicle upon the great circle.

5. The provision of means adapted to permit of steering the vehicle any desired distance or direction from its direct course, and means operable at will to automatically steer it on the direct course from wherever it may be then to its destination. For instance, a craft may be travelling from New York to London under the control of my automatic navigator when it is found desirable to go to the south of the course on which it is being steered. One of the objects of my invention is to allow of the craft thus leaving its direct course, going any desired distance to the south thereof, and then at will automatically taking up a direct course for its destination.

6. The provision of automatic navigational means especially adapted for use on airplanes and other aircraft.

Other objects and advantages will hereinafter appear.

In addition to the above novel results, several constructional features of the invention will be apparent from the following specifications and claims. The invention consists in the novel combination of parts as hereinafter set forth.

A preferred embodiment of the invention is described in the following specifications and illustrated in the accompanying drawings. The broad scope of the invention is briefly described below, and is more particularly set forth in the appended claims.

In the drawings:

Fig. 4 is a vertical section of the computing assembly taken on line 4—4 of Fig. 1.

Fig. 5 is a vertical section on line 5—5 of Fig. 1.

Fig. 6 is a plan of a portion of the mechanism shown in Fig. 5.

Fig. 7 is a front elevation of a portion of the latitude dial assembly in the latitude and longitude meter used in conjunction with this device.

Fig. 8 is a front elevation of the corresponding longitude dial assembly.

Fig. 10 is a diagram of the course setting mechanism showing particularly the electrical circuits involved.

Fig. 11 is a diagrammatic representation of the electrical circuits of the automatic steering means.

Fig. 12 is a perspective view of a portion of the automatic steering means showing particularly the relation between the controller and the generator.

I. GENERAL DESCRIPTION OF APPARATUS

The automatic navigator herein described is assumed to be used in conjunction with a latitude and longitude meter such as that covered by my copending application No. 221,732 filed September 24, 1927, adapted to continuously register the latitude and longitude of the position of the vehicle on which it is mounted, and in conjunction with an automatic steering device such as that covered by my copending application No. 200,630 filed June 22, 1927, adapted to maintain the resultant motion of the vehicle on which it is mounted along a course having as its true bearing the bearing set on the controller.

The automatic navigator includes a destination indicator on which the latitude and longitude of a desired destination may be registered. It also contains mechanism actuated by this indicator and by the latitude and longitude meter in such a manner that from the two latitudes and longitudes the direct course from the position occupied by the vehicle to the destination is mechanically determined, as well as the distance between these two points. It also includes mechanism adapted to register the distance thus mechanically determined, and means adapted to either set the controller of the automatic steering device automatically on the course mechanically determined, or to leave it free to be set on any other course, at the operator's option.

II. Detailed description of preferred embodiment

A. General arrangement

It is a fact well understood by all navigators that the shortest path that can be travelled between two points on the earth's surface is along the great circle joining the two points. In order to have all course and distance determinations made on the basis of a great circle course, I provide an assembly adapted to determine the course and distance by a means which consists substantially in mechanically fixing the position of the two points on the surface of an imaginary sphere, certain members being provided to mechanically join the two points in a manner adapted to give both the bearing of the course at the initial point, and the distance between the two points.

Figure 1:
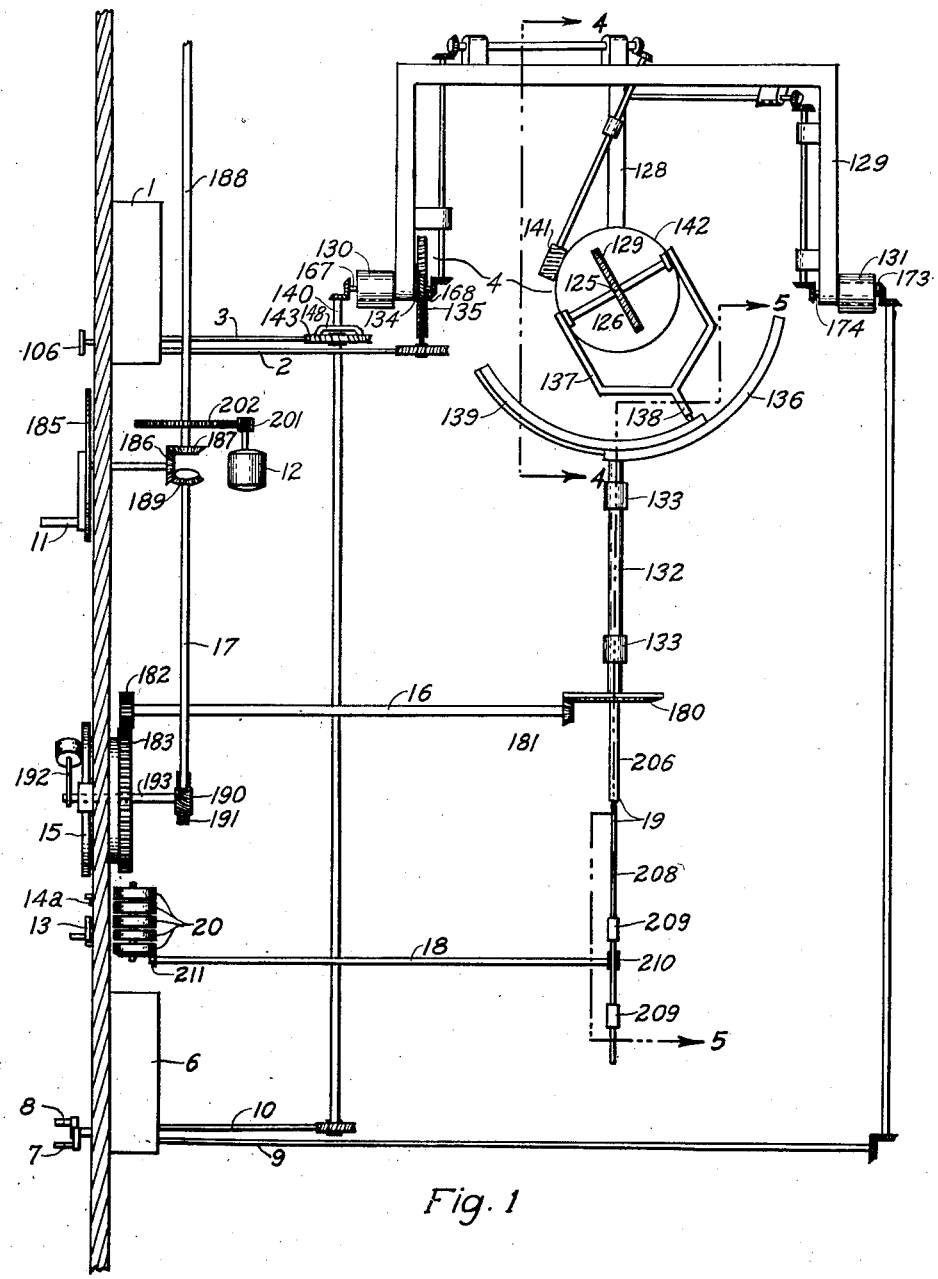
Fig. 1 is a general plan of the device.

In Fig. 1, which is a general plan of my preferred embodiment, numeral 1 represents the latitude and longitude meter, which, as described in my copending application above referred to, is adapted to continuously register the latitude and longitude of the position occupied by the craft. The latitude and the longitude dials of this meter are adapted to actuate, in the manner more particularly set forth hereafter, shafts 2 and 3, respectively, and through them to actuate computing assembly 4, which is adapted to determine the course and distance.

Numeral 6 represents the destination indicator (for front view of same see Fig. 9), on which the latitude and the longitude of the destination may be set by means of handles 7 and 8, respectively. The setting of the latitude actuates shaft 9 in the manner hereinafter indicated, and through it actuates assembly 4, while the setting of the longitude actuates the same assembly through shaft 10.

Numeral 11 represents the controller handle for setting the course to be followed, this part being identical with that designated by numeral 5 in my copending application for automatic steering device. This controller may be operated either by hand or by motor 12 in the manner hereinafter set forth. In this connection I provide switch handle 13 which may be placed on contact 14 (see Fig. 9) if it is desired that controller 11 be automatically positioned by motor 12, or may be placed on rest 14a to render controller 11 free to be positioned by hand.

Numeral 15 represents the course indicating dial by means of which the course determined by assembly 4 is indicated, and in conjunction with which I provide course setting mechanism adapted to control the action of motor 12 in setting the proper course on controller 11. Assembly 4 actuates this mechanism through the medium of shaft 16, while controller 11 actuates it through shaft 17.

Figure 9:
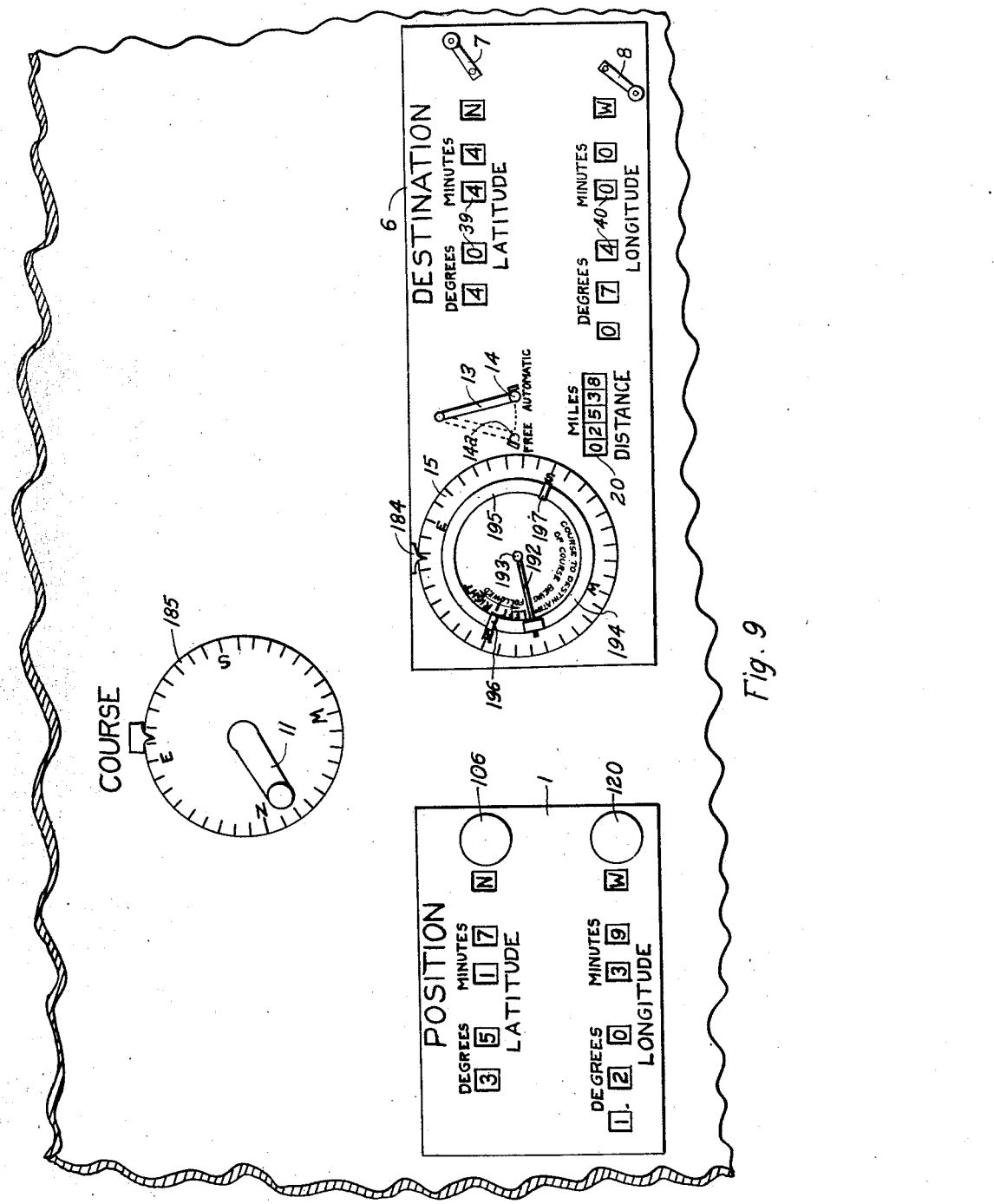
Fig. 9 is a front elevation of the instrument board showing the visible portions of the instruments concerned with this device.

Assembly 4 is designed to rotate shaft 18 by means of distance transmitting assembly 19 in an amount proportional to its measure of the distance to the destination, and through this shaft to actuate distance registering dials 20 (see Figs. 1 and 9).

B. Automatic steering device

The automatic steering device, which as previously mentioned is designed to operate in conjunction with this navigator and is covered in detail by the copending application previously mentioned, may be briefly described as follows:

The device includes an earth inductor compass (see Figs. 11 and 12), consisting of an armature 318 revolving on a vertical axis in the earth's magnetic field, the brushes 320 and 321 which lead the current from the armature being positioned by controlled handle 11 through worm gear 323, and the current generated shown by indicator 330. Since the direction and amount of current generated depends upon the angle pertaining between the brush contacts and the earth's magnetic lines of force, there will for each setting of the brushes be a particular direction in which the craft on which the compass is mounted may be headed so that no current will be generated, while any departure to right or left of such heading will cause current to be generated in one direction or the other, which registered on indicator 330 will show whether the departure is to the right or the left of the course for which controller handle 11 has been set.

I insert a relay 331 in series with solenoid 329 which operates indicator 330, this relay operating to close circuits 303 and 304, selectively, whenever there is departure of the craft to one side or the other of the course set by handle 11. The current in circuits 303 and 304 serves to selectively operate reversible servo-motor 307 in opposite directions. This servo-motor positions the rudder.

Follow-up mechanism, limiting the rudder movement to amounts proportional to the craft's departure from course, is provided by means of corrector unit 379, while drift and magnetic variation correction are introduced through a similar unit 378. These corrector units serve to displace brushes 320 and 321 with respect to controller handle 11 by an amount definitely fixed by the longitudinal position of the corrector unit on shaft 324, the amount of angular change varying in proportion to the longitudinal movement of this unit. Unit 379 is mechanically connected to the rudder, so as to be moved back and forth in direct proportion to rudder movement, while unit 378 is primarily positioned by the rotation of drift sighting device 382, but is also arranged to handle magnetic variation correction by clamping the unit to rack bar 388 at a longitudinal position corresponding to such correction.

Each corrector unit consists of a ring (not shown) longitudinally constrained in its outer shell, but free to rotate therein, and having two oppositely inwardly extending projections extending through helical slots on sleeve 363 and into oppositely spiralled helical grooves on inner shaft 366, thus interlocking the sleeve and shaft in an angular relationship fixed by the longitudinal position of the unit.

Thus mechanism is provided for positioning the rudder to return the craft to course whenever displaced therefrom, for properly limiting rudder movements to amounts proportional to the departure from course, and to correct for magnetic variation by merely indicating the amount thereof, and for drift by merely sighting, so that the course set by controller handle 11 becomes the resultant course made good by the craft as referred to the true meridian.

C. Latitude and longitude meter

Figure 13:
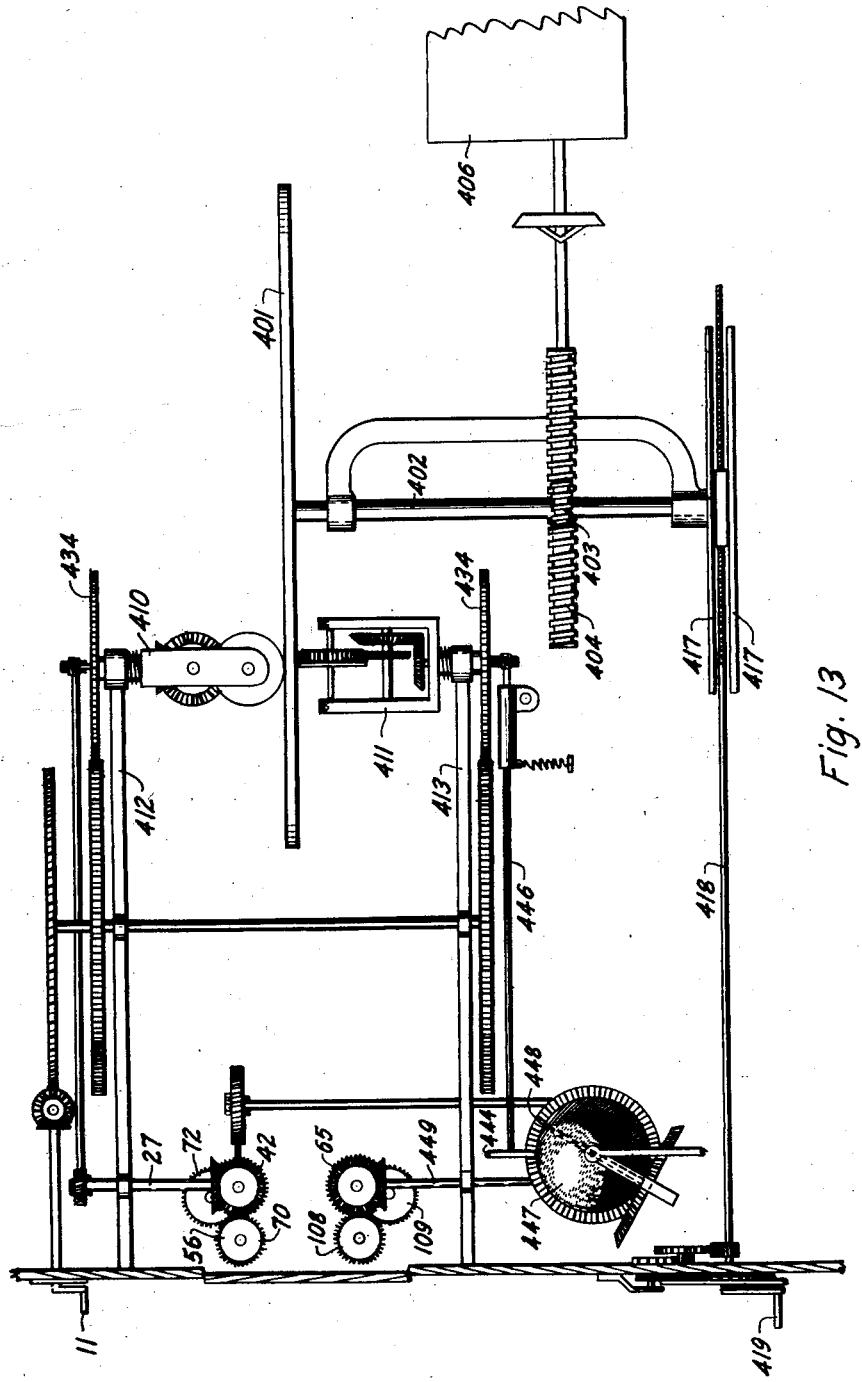
Fig. 13 is a side elevation of the latitude and longitude meter mechanism.

Latitude and longitude meter 1, which is assumed to operate in conjunction with my present device, is similar to that covered by my copending application, above referred to, and may be identical with the meter therein described except for certain minor changes in the dial assembles, as indicated in Figs. 7 and 8 and hereafter described. The meter includes (1) a lineal-distance transmitting assembly (see Fig. 13) consisting of disc 401 mounted on shaft 402 supported in guides 417 so that by the rotation of shaft 418 the position of the disc may be changed so as to vary at will the radial distance to the points of contact of assemblies 410 and 411, the disc being driven by engine 406 through worm 404 and worm gear 403, (2) two projected-distance transmitting assemblies, 410 for transmitting latitude distance and 411 for transmitting longitude distance, (3) a longitude-conversion assembly adapted to convert motion proportional to distance travelled in longitude into motion proportional to the angular measure of longitude traversed, (4) latitude dials actuated by assembly 410, and (5) longitude dials actuated by assembly 411 through the longitude-conversion assembly.

Disc 401 is revolved proportional to engine speed, but the lineal speed of the surface of the disc at its contact with assemblies 410 and 411 may be adjusted to any desired value by properly adjusting the effective radius by the use of handle 419 operating threaded shaft 418, and may therefore be made proportional to observed ground speed or true speed of the craft. Assemblies 410 and 411 are rotatable in their supporting arms 412 and 413 respectively, and are connected to course controller 11 in such a manner that each change of course set results in an equal change in orientation of the assemblies, the contact disc of assembly 411 always making with the radius of disc 401 an angle equal to that of the course with the meridian, and the disc of assembly 410 the complement of such angle, so the rate of motion of the periphery of these two discs will bear to the rate of motion of disc 401 at its point of contact with them the ratios which the respective cardinal projections of the craft's movement bear to the movement itself, and the amount of movement transmitted by these assemblies will be proportional to the cardinal projections of the distance traversed by the craft.

The movement of assembly 410 is arranged to be transmitted to the latitude dials by an arrangement differing slightly from that described in my copending application and I will therefore describe the mechanism involved in some detail. Referring to Fig. 7, which shows a portion of the latitude dial assembly, gears 42 and 72 are connected by gears 73 and 74 so as to always have equal and opposite rotation, just as with the similarly numbered parts described in my copending application, and as described in that application gear 70 is slidably keyed to sleeve 68 and arranged to mesh with either gear 42 or gear 72 and to drive dial 56 through the medium of sleeve 68. Instead, however, of gear 42 being driven directly by a bevel gear, and sleeve 68 actuating dial 56 through a slidable friction drive, sleeve 68 is rigid with dial 56, and dial 42 is driven through a slidable friction drive, as follows:

Shaft 27 is actuated by the latitude projected distance trasmitting assembly 410 of the latitude and longitude meter, and is rigid with bevel gear 28, (see Fig. 7), which meshes with bevel gear 29, which in turn is rigid with sleeve 30, to which disc 31 is slidably keyed, so as to always rotate with the sleeve. Disc 31 is forced against the face of gear 42 by spring 32 in such a manner as to drive that gear by friction. Pinion head 106 may be arranged to actuate a bevel gear meshing with gear 42 instead of one meshing with gear 58, for the resetting of the latitude dials. Thus gears 42 and 72 are directly geared to dial 56 and not slidable with respect to it, and their motion being proportional to the algebraic change in latitude is suitable to utilize for actuating shaft 2, which shaft is arranged to be actuated by bevel gear 33 rigid with that shaft and meshing with bevel gear 34 rigid with gear 72. Thus shaft 2 is rotated in proportion to the algebraic change in latitude registered.

The movement of the longitude projected distance transmitting assembly 411 is arranged to be transmitted to the longitude dials through the longitude conversion mechanism as follows:

The movement is transmitted through a train of shafts and gearing to disc 444, which therefore rotates in proportion to longitude projected distance, and which is arranged to rotate sphere 447 on its axis 448 through frictional contact. The mounting of the sphere is connected to the latitude dials in such a manner that it always makes with the horizontal (the direction of shaft 446 to which disc 444 is attached) an angle equal to that registered on the latitude dials. Sphere 447 thus becomes in effect a miniature earth with the circle of contact along which disc 444 drives sphere 447 always proportional in size to the circle of latitude at the position registered on the latitude dials. Therefore if disc 444 rotates in proportion to longitude projected distance, sphere 447 will rotate in proportion to angular measure of longitude.

This rotation is transmitted to shaft 449 which serves to actuate the longitude dials just as shaft 27 does the latitude dials, and I propose herein to alter the gear arrangement in conjunction with the longitude dials from that shown in my copending application in a manner exactly similar to that already described for the latitude dials. The motion of shaft 449 is transmitted to bevel gear 35 (see Fig. 8). Through the friction of disc 36 this motion is transmitted to gear 65 which is permanently geared to gear 109 so that the two always rotate equally in opposite directions. Gear 108 is arranged to be selectively meshed with either gear 65 or gear 109, and being keyed to sleeve 113 rigid with dial 115 transmits its motion directly to that dial. Shaft 3 is permanently geared to gear 109 through bevel gears 37 and 38, so that shaft rotates in unison with the dials but does not reverse direction when the dials reverse.

D. Destination indicator

Destination indicator 6 contains a latitude dial assembly exactly similar to that contained in meter 1, except that instead of being automatically actuated by a shaft such as shaft 27, and reset by a pinion head such as pinion head 106, parts 27, 28, 29, 30, 31, 32 and 106 are dispensed with, and I provide crank handle 7 rigid with a bevel gear meshing with gear 42 of this indicator for actuating the dials and setting on them the latitude of the desired destination in a manner very similar to that in which the dials of meter 1 are set by pinion head 106. Shaft 9 is actuated by gear 72 of the indicator just as shaft 2 is actuated by gear 72 of meter 1. Thus any movement of crank 7 is transmitted directly to shaft 9 and to the latitude dials 39 of this indicator, the relative direction of movement of the crank and shaft being always the same, but the relative direction of movement of the shaft and dials being opposite for opposite sides of the equator. With this arrangement shaft 9 will be rotated exactly in proportion to the algebraic change in the latitude registered on dials 39.

This destination indicator also contains a longitude dial assembly which bears exactly the same similarity to the longitude dial assembly of meter 1, that the latitude dial assembly of indicator 6 bears to that of meter 1. Crank handle 8 is provided to actuate dials 40 of this assembly, and through gears 109 and 38 of this assembly actuates shaft 10, just as the longitude dial assembly of meter 1 actuates shaft 3. Thus shaft 10 will be rotated exactly in proportion to the algebraic change in the longitude registered on dials 40.

It will therefore be observed that destination indicator 6 includes convenient means for registering the latitude and longitude of a desired destination, and for transmitting through shafts 9 and 10, respectively, movement in proportion to the change in the value registered for each of these quantities.

E. Computing assembly

1. *General arrangement.*—As previously mentioned, this assembly is adapted to determine mechanically the course and distance to the destination registered on indicator 6, on the basis of spherical principles. The great circle course from one point on the earth's surface to another such point, may be considered as one side of a spherical triangle of which the remaining two sides are the co-latitudes of the two points, and the angle between these two sides is the difference of longitude of the two points. With the latitude and longitude of the two points known, two sides and the included angle of this spherical triangle become known, and from them the bearing of the great circle at the first point may be determined as one of the two remaining angles of the triangle, and the distance between the two points as the length of the remaining side of the triangle. It will be noted that for this solution the actual value of each of the two latitudes is required, but in longitude it is the difference of longitude rather than the separate value of each longitude that is required.

I provide for the mechanical solution of such a triangle, by measuring out mechanically the two latitudes and the difference of longitudes on an imaginary sphere and mechanically measuring the desired angle and distance. I use the term "imaginary sphere" for the reason that while I provide mechanism adapted to occupy exactly the relative positions of the two points concerned, as such points would be reproduced on a sphere of a certain size, and mechanism adapted to occupy the position of the great circle of such a sphere joining said two points, I do not provide for mechanically reproducing other portions of such sphere. As the mechanical solution is equivalent to plotting the two points and measuring the distance and angle on such a sphere, the functioning of the various parts may be best understood by imagining such a sphere even though the complete sphere is not mechanically reproduced.

Figure 2:
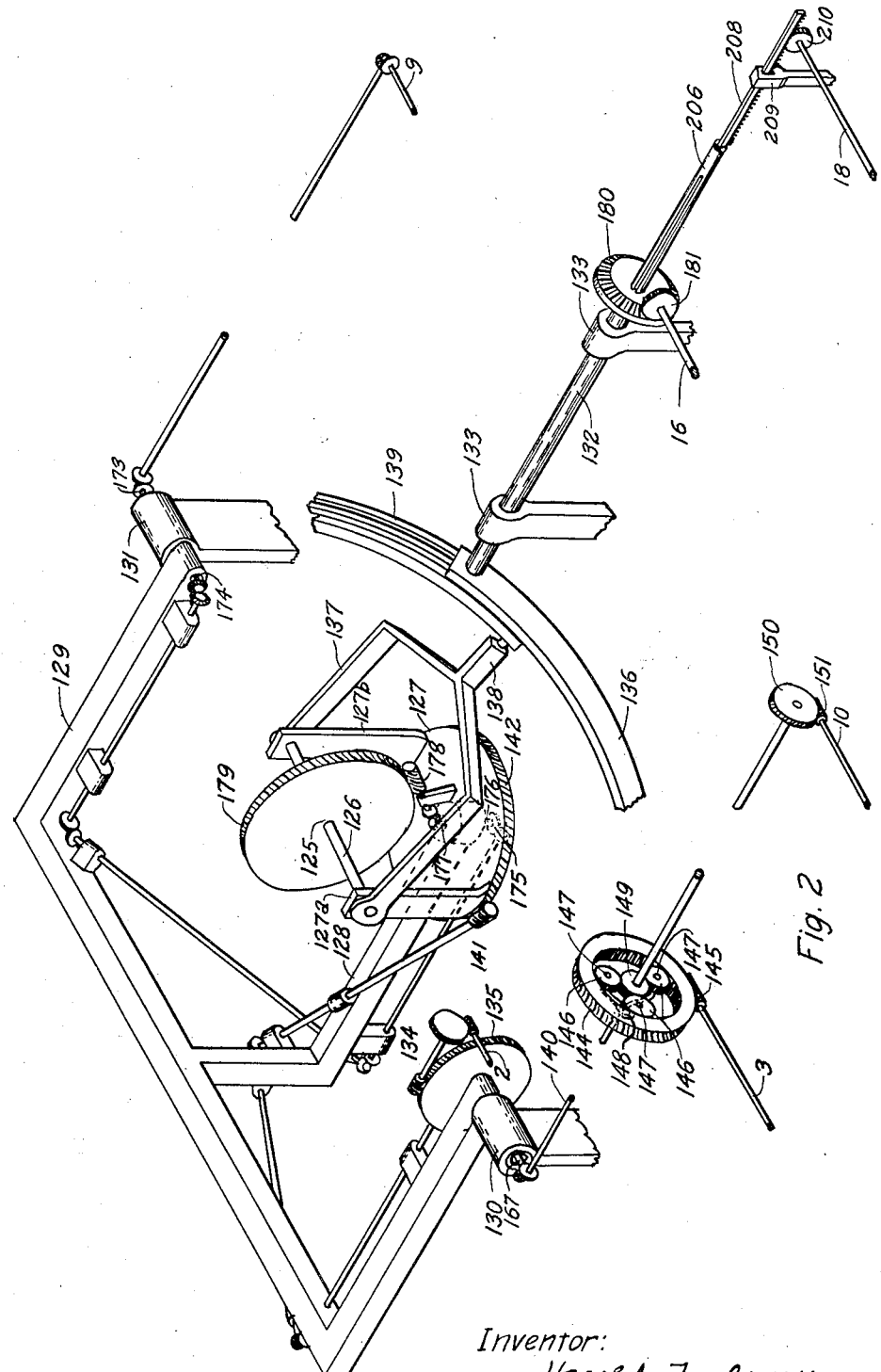
Fig. 2 is a perspective view of the computing assembly.

The center of this sphere is point 125 which is the mid-point of shaft 126, which is rotatably supported by mounting 127, which in turn is rotatable with respect to its supporting arm 128 along an axis which perpendicularly intersects shaft 126 at point 125 (see Figs. 2 and 4). This last mentioned axis, which in my preferred embodiment is the axis of bearing 152 and is the common perpendicular to arm 128 and shaft 126, is the principal axis of the imaginary sphere, corresponding (if the sphere is considered to represent the earth) to the rotational axis of the earth. Arm 128 is rigid with yoke 129, which in turn is rotatably supported in fixed trunnions 130 and 131 so as to be rotatable about an axis which perpendicularly intersects the principal axis of the imaginary sphere at point 125. Sleeve 132, which is horizontal in my preferred embodiment, is rotatably supported in fixed bearings 133 in such a position that its central axis perpendicularly intersects the axis of trunnions 130 and 131 at point 125. Thus the respective axes of sleeve 132, trunnions 130 and 131, bearing 152, and shaft 126 are successively perpendicular, each being perpendicular to the part named next in order, but the axes are relatively rotatable in such a manner that no two of said axes are parallel or coincident, and no three mutually perpendicular, except in certain special positions of the apparatus.

The intersection of the central axis of sleeve 132 with the surface of the imaginary sphere, represents on the sphere the point occupied by the vehicle on which the device is mounted. Although this point is fixed with relation to the general apparatus and the vehicle, yoke 129 may be rotated on its trunnions so that the principal axis of the imaginary sphere will make any desired angle with the central axis of sleeve 132, thereby bringing this point to a position with respect to said sphere corresponding to any desired latitude. I provide for maintaining it at a position corresponding to the latitude registered on meter 1 through the action of worm 134 on worm gear 135, said worm gear being rigid with yoke 129, and said worm being actuated through proper shafts and gearing by shaft 2, which as previously described rotates in proportion to the change of latitude registered on meter 1.

Rigid with sleeve 132 is arc 136, which is constructed to a radius equal to its distance from point 125, and the arc is attached to sleeve 132 in such a position that the axis of the sleeve is radial to the arc. Therefore when the sleeve is rotated in its bearings every portion of arc 136 will remain at its same distance from point 125, the arc thus forming an arc of a sphere having point 125 for its center, regardless of the particular position occupied by the arc.

Rigid with shaft 126 is yoke 137 rigid with arm 138, to the outer end of which arc 139 is pivotally attached. Arc 139, like arc 136 is constructed to a radius equal to its distance from point 125, and the pivotal axis of its attachment to arm 138 is radial to the arc and passes directly through point 125, so that the arc remains centered on point 125 regardless of the position of arm 138 or of the position of the arc with respect to arm 138. The radius of arc 139 is slightly less than that of arc 136 and the outer face of arc 139 is arranged to slidably interlock with the inner face of arc 136 as shown more particularly in cross-section in Fig. 5.

The point of destination is represented on the imaginary sphere by the point at which its surface is pierced by the pivotal axis of attachment of arc 139 to arm 138, which in my preferred embodiment coincides with the central axis of arm 138. This may be brought into its proper relative relation to the representation of the point occupied by the vehicle, which as previously mentioned is the point where the surface of the sphere is pierced by the central axis of sleeve 132, by setting arm 138 so that it makes with the principal axis of the sphere an angle equal to the co-latitude of the destination, and so that the plane containing said principal axis and the central axis of arm 138 makes with the plane containing said principal axis and the central axis of sleeve 132 an angle equal to the difference of longitude of the two points.

As will be noted, should arm 138 be set for the same latitude and longitude as that occupied by the vehicle arm 138 would be brought directly into line with sleeve 132, their central axes coinciding. If arm 138 be then reset for a lesser latitude it will be rotated downward on axis 126 through an angle equal to the difference in latitude (assuming that the mechanical connections are so made that the upper piercing point of the principal axis of the imaginary sphere represents the north pole), while if the arm is reset for a more westerly longitude it will be rotated about the principal axis of the sphere to the right (as viewed from the direction representing north) through an angle equal to the difference in longitude. The amount by which arc 139 has slid with respect to arc 136 during the movements of arm 138 just described, serves as a measure of the distance from the vehicle to the point having latitude and longitude corresponding to that for which arm 138 is positioned, while the angle that arc 136 makes with the vertical at its point of attachment to sleeve 132 will measure the bearing at the vehicle of the great circle course from the vehicle to such other point. That this is true is evident from the fact that arc 136 always represents a great circle of the imaginary sphere, being always maintained with point 125 as its center, that it is always lined centrally through the points on such sphere representing the point occupied by the vehicle and the point of destination, and from the fact that a vertical line through the axis of sleeve 132 tangent to the imaginary sphere represents the meridian through the vehicle, since the principal axis of said sphere is only movable in the vertical plane containing the axis of said sleeve.

I provide for automatically positioning arm 138 to correspond to the latitude set on destination indicator 6 by mechanism, hereafter described in detail, adapted to transmit the rotation of shaft 9 (which as already described is proportional to the change in such latitude registration) to shaft 126 in such proportion that the rotation of said shaft will be equal in amount to the change in latitude angle registered and in such manner that the position of shaft 126 will not be rotatably affected by the rotation of yoke 129 in its trunnions or the rotation of mounting 127 in bearing 152. I also provide for automatically positioning arm 138 to correspond to the difference between the longitude set on indicator 6 and that set on meter 1, by mechanism, also described hereafter, adapted to rotate shaft 140 in proportion to such difference and by mechanism adapted to transmit that motion to worm 141 (irrespective of the rotation of yoke 129 in its trunnions) in such proportion that worm 141 will rotate worm gear 142 (which comprises a rigid part of mounting 127) through an angle with respect to arm 128 equal to the angular difference of the two longitudes registered.

*2. Longitude subtractor.*—The difference between the longitude registered on meter 1 and that registered on indicator 6 is measured by differential gear assembly 143, which is arranged to rotate shaft 140 in proportion to such difference. This assembly includes annular ring 144 (see Fig. 2), the outer surface of which is arranged as a worm gear to mesh with worm 145 rigid with shaft 3 (which as previously described rotates in proportion to the change in longitude registered on meter 1), and the inner surface of which is arranged to mesh with three gears 146. These gears 146 are rotatably mounted on axes 147, all three of which axes are rigid with spider 148 which also is rigid with shaft 140. At the center of the assembly is gear 149 rigid with worm gear 150 and arranged to mesh with gears 146. Worm gear 150 is actuated by worm 151 rigid with shaft 10, which as previously described rotates in proportion to the change in longitude registered on indicator 6.

Thus if ring 144 is stationary, the rotation of gear 149 will feed gears 146 around and rotate spider 148 in the direction of rotation of gear 149 by an amount proportional to such rotation, while if gear 149 is stationary the rotation of ring 144 will rotate spider 148 by an amount proportional to its motion. Worms 145 and 151 are so arranged that a westerly change in the longitude registered on meter 1 will rotate ring 144 in one direction, while a similar change in the longitude registered on indicator 6 will rotate gear 149 in the opposite direction. Also the arrangement is such that a given angular change in one longitude registration will produce a rotation of spider 148 equal in amount, though opposite in direction, to that produced by an equal change in the other longitude registration. Thus if both longitudes are changed by the same amount, giving no net change in the difference of longitude, there will be no net rotation of shaft 140, while for any change of either longitude singly, or unequal change of the two longitudes, shaft 140 will rotate in proportion to the net change in the difference of longitude.

*3. Introduction of variables.*—As previously described this assembly determines the desired course and distance from three variables, the latitude of the vehicle, the latitude of the destination, and the difference of longitude of these two points, and I provide for the introduction of each of these variables into the assembly so as to actuate the proper parts thereof without being affected by the rotary movements incident to the introduction of the other variables.

Yoke 129 is rotated in its trunnions by an amount proportional to the change in latitude of the vehicle, by the mechanism described under section II—E—1 above. In order to introduce the remaining two variables in a manner that will not interfere with the rotation which accomplishes the introduction of this first variable, and in a manner in which the desired parts may be accurately positioned irrespective of the rotation of yoke 129 on its trunnions, or the rotation of mounting 127 in bearing 152, I provide three corrector units similar to that shown in Fig. 3, one in conjunction with trunnion 130 for introducing the difference of longitude, and two for introducing the latitude of the destination, one in conjunction with trunnion 131 and the other in conjunction with bearing 152 (which is the bearing rigid with arm 128 for supporting mounting 127, see Fig. 4).

Figure 3:
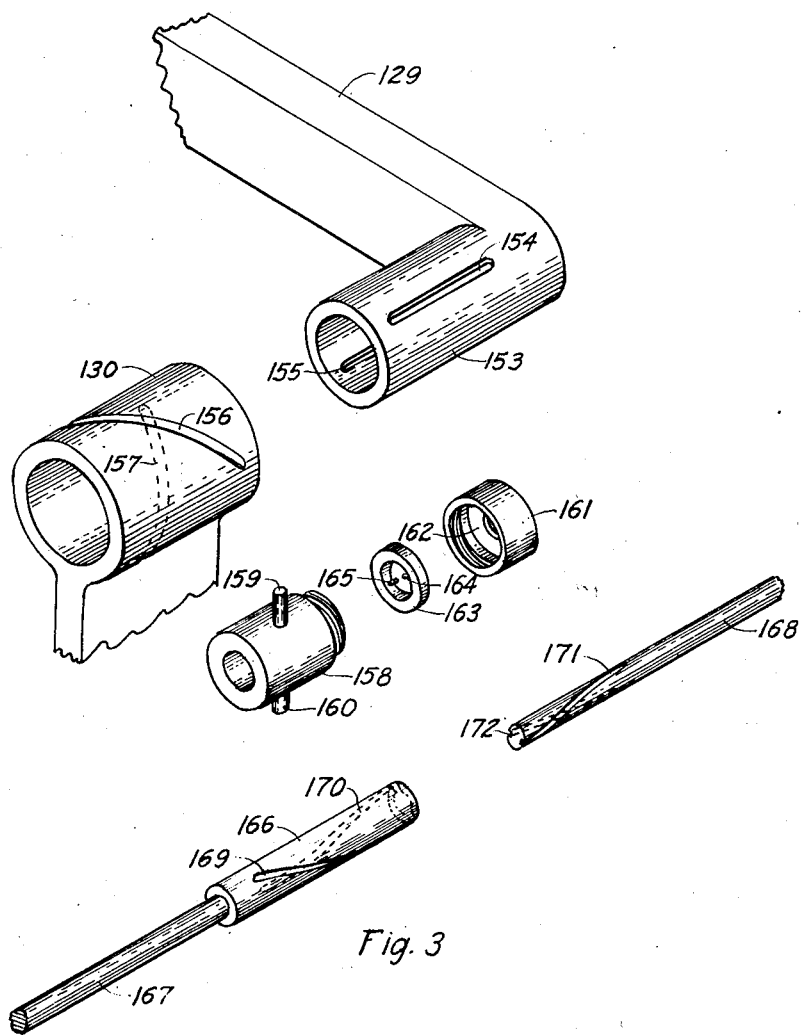
Fig. 3 is a perspective view showing, disassembled, one of the corrector units utilized for introducing the variables into this assembly.

Fig. 3 shows in particular the first mentioned corrector unit, disassembled. Yoke 129 is rotatably supported by sleeve 153 which is rigid with the yoke and fits into trunnion 130. Sleeve 153 has, on two diametrically opposite sides, two longitudinal slots 154 and 155, while trunnion 130 has two helical slots 156 and 157 directly opposite each other. Fitting smoothly in sleeve 153 is a short cylinder 158 having two pins 159 and 160 projecting radially from opposite sides thereof. One end of this cylinder is reduced in size and threaded to mesh with cap 161, which is also of a size to fit smoothly into sleeve 153, and which has an annular outer end 162. Arranged to fit smoothly inside of cap 161 is ring 163 of a thickness just equal to the clearance between the end of cylinder 158 and annular end 162 of cap 161, with just enough freedom to allow of ring 163 rotating freely with respect to the cap and cylinder. Projecting radially inward from two opposite points on ring 163 are two pins 164 and 165. Fitting smoothly inside of cylinder 158 is sleeve 166 rigid with shaft 167, and into this sleeve smoothly fits shaft 168. Sleeve 166 has two helical slots 169 and 170 in opposite faces thereof and shaft 168 has two corresponding grooves 171 and 172, also helical but curving in the opposite direction.

When this corrector unit is assembled, cylinder 158 is placed so that pin 159 extends out through slots 154 and 156 while pin 160 extends out through slots 155 and 157. Also in the assembling, pin 164 extends inward through slot 169 and into groove 171, while pin 165 extends in through slot 170 into groove 172. These last mentioned pins serve to lock shaft 167 to shaft 168, and so long as ring 163 is restrained from moving longitudinally, no angular displacement of one shaft with respect to the other is possible, but the rotation of shaft 167 will serve to rotate ring 163 and shaft 168 by exactly the amount shaft 167 is rotated. If however ring 163 is slid longitudinally with respect to sleeve 166, there will result an angular displacement of shaft 168 with respect to shaft 167 equal to the sum of the angles turned through by slots 169 and 171 in the longitudinal distance through which ring 163 is displaced. Ring 163 is confined by cylinder 158 and cap 161 so that it can have no longitudinal movement along sleeve 166 except as said cylinder is moved longitudinally. Cylinder 158 is positioned longitudinally by pin 159 at the intersection of grooves 154 and 156 (pin 160 fixing the same longitudinal position by the intersection of grooves 155 and 157). This cylinder will therefore be restrained from longitudinal movement except as the rotation of yoke 129 in its trunnions may change the longitudinal position of the intersection of these grooves. When such rotation takes place the longitudinal movement imparted to cylinder 158 will slide ring 163 longitudinally with respect to sleeve 166, thus causing a rotation of shaft 168 with respect to shaft 167. By making the sum of the angles turned through by grooves 169 and 171 per unit of longitudinal distance equal to the angle turned by groove 156 in the same distance the angular displacement given to shaft 168 with respect to shaft 167 will be exactly equal to the angle through which yoke 129 is rotated with respect to trunnion 130, with the result that shaft 168 will always hold the same angular relation to yoke 129 that shaft 167 does to trunnion 130, and it is possible to transmit the rotation of shaft 167 to parts positioned with yoke 129 without interference with the rotation of the yoke on its trunnions and without the rotation of said yoke producing any effect upon the amount of rotational displacement transmitted from shaft 167 to such parts.

As indicated in Figs. 1 and 2 the rotation of shaft 140 (which as previously described is proportional to the difference between the longitude of the vehicle and that of the destination) is transmitted directly to shaft 167 through a pair of bevel gears, and the rotation of shaft 168 is transmitted through a direct train of shafts and gearing, all supported by mountings rigid with yoke 129, to worm 141, which as previously described rotates mounting 127 in proportion to the rotation thus transmitted to it, and therefore maintains arm 138 in a position corresponding to the longitude difference.

As indicated in Figs. 1 and 2 the rotation of shaft 9 (which is proportional to the change in latitude of destination) is transmitted by a direct train of shafts and gearing to shaft 173 which is connected to shaft 174 by a corrector unit located in trunnion 131, and exactly similar to the corrector unit above described. The rotation thus given to shaft 174 is transmitted through a direct train of shafts and gearing, all supported by mountings rigid with yoke 129, to bevel gear 175. This gear is rigid with shaft 176 which is connected to shaft 177 by a similar corrector unit placed within bearing 152 and positioned by the rotation of supporting sleeve 124 (rigid with mounting 127) with respect to said bearing. This results in the rotation of gear 175 being transmitted to shaft 177 without its being affected by the rotation of mounting 127 with respect to arm 128. The rotation of shaft 177 is transmitted by means of a pair of bevel gears, and a short shaft mounted in a gearing rigid with mounting 127, to worm 178, which therefore rotates in proportion to the change in latitude of the destination and rotates in the same proportion worm gear 179, which meshes with said worm and is rigid with shaft 126 and arm 138. By properly arranging the gear ratios throughout, the motion thus transmitted to arm 138 may obviously be made such as to always maintain the arm at an angle to the axis of bearing 152 equal to the complement of the latitude set on indicator 6. The arm will always be placed in a position corresponding to the hemisphere indicated on indicator 6 because any rotation of handle 7 which feeds the latitude indication past 00° 00′ and therefore changes the hemispherical indication, will feed arm 138 past its right-angled position into a position corresponding to the new hemisphere.

F. Course indication and control

As mentioned under section II—E—1 above, a vertical line through the axis of sleeve 132 represents the meridian through the vehicle, and the angle that arc 136 makes with the vertical at its intersection with said axis is the bearing angle of the great circle course from the vehicle to its destination. With the assumption of directions already mentioned, arc 136 extending vertically upward from sleeve 132 would indicate a due north course, extending horizontally to the right (as viewed from the sleeve) a due east course, vertically downward a due south course, and horizontally to the left a due west course, with intermediate positions indicating the corresponding intermediate bearings. In order to conveniently indicate to the operator the course for which arc 136 is set, and to provide for automatically steering the vehicle, when desired, on the course thus indicated, I provide course indicating dial 15, and the mechanism shown in conjunction therewith in Figs. 1, 9, and 10.

Arc 136 is rigid with sleeve 132, and rigid with the same sleeve is bevel gear 180, which meshes with bevel gear 181, rigid with shaft 16, and therefore drives said shaft in proportion to the angular change in course indicated by arc 136. Rigid with the opposite end of shaft 16 is gear 182 which meshes with gear 183 which is rigid with dial 15, and is so arranged as to rotate said dial by an angular amount exactly equal to the angular displacement of arc 136. The course for which arc 136 is set is indicated by graduations on the face of disc 15, read against fixed pointer 184.

As described in connection with my co-pending application for automatic steering device, above mentioned, controller 11 is adapted to set the course which the vehicle is to follow, each revolution of the controller handle effecting a certain change of course, a convenient arrangement being for each revolution to effect 10° change, and for disc 185 to be rotated through the actual angular change effected so that it may conveniently indicate the actual course being steered. Rigid with controller handle 11 is bevel gear 186, which meshes with bevel gear 187 rigid with shaft 188 which effects the change of course, and also meshes with bevel gear 189 rigid with shaft 17. Also rigid with shaft 17 is worm 190 which meshes with worm gear 191 rigid with trolley 192 and turns same through exactly the angular change of course effected.

Axis 193 of trolley 192 is centered on disc 15, and the trolley is arranged to press firmly against, but easily slidable over, the face of said disc, on which face are two arc shaped conductive plates 194 and 195, each covering practically half a circle of arc, and separated from each other by two insulation strips 196 and 197 (see Figs. 9 and 10). These are placed at the same radius from axis 193 as the operating end of trolley 192, so that the trolley will contact with one plate or the other except when directly over one insulation strip or the other. Insulation strip 196 and trolley 192 are so positioned with respect to their positioning gears that trolley 192 will be directly on insulation strip 196 when controller 11 registers exactly the same course as that indicated by arc 136. If the course on controller 11 is shifted to the right, trolley 192 will be rotated to the left, while if the course indicated by arc 136 is shifted to the right, disc 15 will be shifted correspondingly to the left. Therefore if controller 11 is set for a course to the right of that indicated by arc 136 trolley 192 will contact with plate 194, while if the controller is set for a course to the left of that indicated by arc 136 it will contact with plate 195. These contacts are utilized to set controller 11 to the course indicated by arc 136, as follows:

So long as switch 13 is set on contact 14, its "automatic" position, trolley 192 is energized by battery 197, one terminal of which in continuously connected to switch 13 and the other terminal of which is connected to binding post 198 of motor 12. This motor has two other binding posts 199 and 200, which are connected to plates 194 and 195 respectively. and the windings of the motor are so arranged that connecting the battery to posts 198 and 199 will cause the motor to rotate in one direction, while connecting it to posts 198 and 200 will cause the opposite direction of rotation, and the motor is geared to shaft 188 by means of pinion 201 and gear 202 (Fig. 1) in such a manner that the first mentioned direction of rotation will change the course to the left, and the other direction to the right. Therefore if the controller is set for a course to the right of that indicated by arc 136, trolley 192 will contact with plate 194 and set motor 12 rotating in a direction adapted to set the controller to a course further to the left, while if the controller is set for a course to the left of that indicated, trolley 192 will contact with plate 195 and change the course toward the right. The connection causing the change of course will be automatically broken when controller 11 comes onto the course indicated by arc 136, due to trolley 192 passing off of the contact plate onto insulation strip 196. Should momentum carry the controller past the proper course, contact with the other plate would immediately return it, so that the controller can not come to rest on any course other than that indicated by arc 136, so long as switch 13 is closed.

If it is desired to depart, for any reason from the direct course to the destination, switch 13 may be moved onto its "free" position 14a, in which case the circuit from battery 197 to motor 12 is broken, and the operator is free to set controller 11 to any course that he may desire. Since the latitude and longitude meter will continue to record the position occupied by the vehicle as it moves along its new course, the variables introduced into the computing assembly will continually readjust arc 136 to indicate the great circle course from the position occupied by the vehicle to its destination, and if at any time the operator moves switch 13 onto contact 14, the course controlled mechanism will immediately move controller 11 onto the course then indicated by arc 136, and the vehicle will automatically take up a direct great circle course from the position which it then occupies to its destination.

G. Distance registration

As previously described, the distance from the vehicle to the destination set on indicator 6, is represented, to scale, by the distance along arcs 136 and 139 from the axis of sleeve 132 to the axis of arm 138. This distance will, of course, vary throughout the thickness of these two arcs in proportion to the variation of radial distance from point 125, but the measurement may be made along an arc of any convenient radius concentric with point 125, so long as the exact radius of the arc on which measurement is made is taken into account in determining the scale ratio, and converting the measurement into miles, or other units, of actual distance.

Arc 139 is provided with two flanges, 203 and 204 (see Fig. 5), and along the inner face of flange 203 I provide gear teeth, making this flange, in effect, a curved rack bar. Meshing with this rack bar is pinion 205, rotatably supported with respect to the central axis of sleeve 132. Therefore if arc 139 is slidably displaced with respect to arc 136, as is the case whenever the distance between the axis of sleeve 132 and that of arm 138 is changed, pinion 205 will be rotated with respect to arc 136 by an amount proportional to the change in distance. Longitudinally slidable in sleeve 132, but keyed to it so as not to be rotatable with respect to it, is another sleeve 206, the inner face of which is threaded to mesh with threaded shaft 207 which is rigid with pinion 205. Since sleeve 132 is rigid with arc 136, and since the rotation of pinion 205 with respect to arc 136 is proportional to the change in distance which it is desired to measure, sleeve 206 will be longitudinally displaced with respect to sleeve 132 due to the rotation of shaft 207 by an amount proportional to the change in distance, and the longitudinal position of sleeve 206 with respect to sleeve 132 serves as a direct measure of the distance from the vehicle to the destination set on indicator 6.

I provide distance transmitting assembly 19, adapted to operate registering dials 20 so as to show this distance in miles, or any other unit of measurement that may be desired, and so designed as to be unaffected by the rotation of sleeve 132 in its mountings, even though such rotation be repeatedly in the same direction. This assembly includes rack bar 208, pivotally attached to sleeve 206 (Fig. 5) so as to be rotatable with respect to it along the central axis of sleeve 132. This rack bar is guided in supports 209 so that its toothed face is always kept facing directly downward, regardless of the position of sleeves 132 and 206. Meshing with this rack bar is pinion 210 rigid with shaft 18, which shaft is therefore rotated in proportion to the longitudinal movement of sleeve 206 and rack bar 208, and therefore in proportion to the change in the distance to be measured. On the opposite end of shaft 18 is gear 211 (Fig. 1) which drives registering dials 20. Since the motion thus transmitted to the dials is in direct proportion to the desired change in registered value, any ordinary set of counting dials will properly register the mileage to the destination if the motion of gear 211 is transmitted to the dials through whatever gearing may be necessary to arrange it so that one revolution of the dial of the lowest order will be produced by the amount of movement of rack bar 208 that corresponds to a change in distance from vehicle to destination equal to the change in registration thus produced.

With the apparatus described any increase in the distance from vehicle to destination will result in an increase in the distance of arm 138 from sleeve 132, which will slide arc 139 outward with respect to arc 136, producing a certain rotation of pinion 205 and gear 211, while any decrease in such distance will slide arc 139 inward and produce opposite rotations of said pinion and gear. It is therefore evident that the mechanism described is adapted to maintain on dials 20 a registration indicating the distance from the vehicle to its destination, as measured by the angular distance between sleeve 132 and arm 138.

It is not practicable to construct either arc 136 or arc 139 more than 90° in length, or arm 128 might interfere with the movement of the arcs when the latitude of the vehicle or that of the destination reached a large plus or minus value. With each arc only about 90° in length, arc 139 may slide outward on arc 136 so as to describe a total course from vehicle to destination representing almost half the circumference of the globe. However after arm 138 moved outward to a position representing about half of this distance the rack on arc 139 would pass clear of pinion 205, leaving the distance transmitting assembly disconnected. In order to prevent such a circumstance arising I provide pinion 212 rigid with pinion 205 and meshing with gear 213, which is rigid with bevel gear 214 and is mounted on axis 215 rigid with arc 136 (see Figs. 5 and 6). Near the opposite end of arc 136 I provide another pinion 205a corresponding to pinion 205 and meshing with the same rack, and I also provide pinion 212a, gear 213a, bevel gear 214a, and shaft 215a, corresponding respectively to parts 212, 213, 214 and 215 previously described. I also provide bevel gears 216 and 216a meshing with bevel gears 214 and 214a, respectively, and both rigid with shaft 217, so that pinions 205 and 205a are always geared to each other so as to rotate in exact unison. Pinions 205 and 205a are so positioned on arc 126 that arc 139 will always be in a position to actuate one or the other or both of them, so that the transmission and registration of distance is continuously provided for whether arc 139 passes clear of pinion 205 or not.

H. Summary of operation

In practice the operation of this automatic navigator is closely linked up with the operation of the latitude and longitude meter and with that of the automatic steering device, the operation of which devices is more particularly covered in the copending applications previously referred to. As described in the specifications covering the automatic steering device convenient means are provided in connection with that device and previously mentioned and briefly described herein, for correcting for magnetic variation and for the lateral drift of the vehicle. If these means are properly operated the resultant path of the vehicle will necessarily lie along a line having the bearing indicated by controller 11 and disc 185, so long as the vehicle is allowed to operate under automatic control.

In operating the latitude and longitude meter correction should be made for the effect of head or tail winds or currents, as described in the specifications covering that device, and the meter should be set to the latitude and longitude of the starting point, whereupon it will continue to automatically register the latitude and longitude of the vehicle throughout the trip. On account of the difficulty of making exact allowance for some of the variables, occasional check of the latitude and longitude registered should be made against the actual latitude and longitude of the vehicle on long trips, and the dials reset to eliminate any error which may have accumulated.

The only additional acts required on the part of the operator, in order to operate my automatic navigator, is the setting of the latitude and longitude of the desired destination on dials 39 and 40 respectively by means of handles 7 and 8 respectively, and the setting of switch 13 on its "automatic" or "free" positions, 14 and 14a respectively, in order to automatically maintain the vehicle on the direct course to its destination or to leave it free to follow some other course as may at the time be desired. In the manner heretofore described in detail, and hereafter summarized, the course set on controller 11, and therefore the resultant path followed by the vehicle, will be the direct course from the vehicle to its destination, so long as switch 13 is on contact 14, and any correction made in the latitude and longitude set on meter 1 will immediately and automatically correct the course being followed correspondingly. Therefore it does not matter how far the vehicle departs from its course, either due to incorrect allowance for variables or by being deliberately steered off under "free" control, disc 15 always indicates the direct course from the point registered on meter 1 to that set on indicator 6, and the position of this disc is immediately mechanically responsive to any changes in the values registering the position of either point, and controller 11 automatically brings the vehicle onto such changed course whenever switch 13 is closed.

In addition to thus controlling the course, the distance from the point the latitude and longitude of which appears on meter 1, to the point the latitude and longitude of which appears on indicator 6, is automatically indicated on dials 20. This value appears continuously whether switch 13 is on "automatic" or "free" and is automatically corrected for change in either of the latitude or longitude registrations whether such change be due to the resetting of the indicator dials, the gradual movement of the meter dials due to the movement of the vehicle along its path, or the resetting of the meter dials to correspond to a newly observed position.

The mechanical means by which disc 15 is positioned to indicate the direct great circle course from the point indicated by the latitude and longitude registered on meter 1 to the point indicated by the latitude and longitude registered on indicator 6, and by which dials 20 are made to register the distance between said points, have already been described in detail, and may be summarized as follows:

Arm 138 is rotatably supported with respect to three successively perpendicular axes, namely that of trunnions 130 and 131, that of bearing 152, and that of shaft 126, which three axes intersect in a common point 125. Sleeve 132 is mounted in a fixed position but rotatable with respect to its longitudinal axis which also passes through point 125. Shaft 2 is connected to the latitude dials of meter 1 so as to always be moved in proportion to the movement and the change of registration of those dials, while shaft 3 is similarly connected to the longitude dials of meter 1, and shafts 9 and 10 similarly connected to the latitude and longitude dials respectively of the destination indicator 6. These shafts are so connected to the pivotal mountings of arm 138 that their motion makes it assume the same angular position with respect to the axis of sleeve 132 as measured at point 125, that the point indicated on destination indicator 6 holds with respect to the point indicated on meter 1 as measured at the center of the earth. This is accomplished by utilizing the motion of shaft 2 to rotate yoke 129 on its trunnions and maintain an angle between the axis of sleeve 132 and that of bearing 152 equal to the complement of the latitude registered on meter 1, by subtracting the motion of shaft 3 from that of shaft 10 by means of differential gears 143 and transmitting the resultant motion of shaft 140 through a corrector unit in trunnion 130 and utilizing it to rotate arm 138 on bearing 152 into a plane making with the plane containing the axis of sleeve 132 an angle equal to the difference between the longitude registered on meter 1 and that registered on indicator 6, and by utilizing the motion of shaft 9, transmitted through a corrector unit in trunnion 131 and through a similar unit in bearing 152, to rotate arm 138 on axis 126 so as to maintain it at angle with the axis of bearing 152 equal to the complement of the latitude registered on indicator 6. Thus the extremities of the axes of arm 138 and sleeve 132 are brought into relative positions representing to direction and scale the point of destination, and that occupied by the vehicle respectively, with point 125 representing the center on the earth, and the common perendicular to the axis of sleeve 132 at its inner extremity and to a line parallel to the axis of trunnions 130 and 131 representing the meridian through the point occupied by the vehicle.

These two points are connected by two relatively slidable arcs 136 and 139, both concentric with point 125, arc 136 being rigid with sleeve 132, while arc 139 is pivoted to arm 138. These two arcs therefore occupy the path representing the great circle course from the vehicle to its destination, or more particularly such path is occupied by the centerline of these two arcs measured at a radial distance from point 125 equal to that of pinions 205 and 205a. The representation of the meridian through the vehicle being a line fixed in its position relative to the apparatus, the course to destination is directly indicated by the angular position of arc 136 and of sleeve 132 rigid therewith. This angular position is transmitted directly to disc 15 by means of shaft 16 and connected gearing, thereby indicating on disc 15 the course to destination.

Controller 11 is made to indicate the same course as that set on disc 15, so long as switch 13 is closed, by providing trolley 192, geared to the controller, and contacting with plates on the face of disc 15 in such a manner that whenever the course set on controller 11 differs from that indicated by disc 15 a contact is made which is adapted to actuate motor 12 in the direction which moves controller 11 toward the course set on disc 15. Just when the two courses are in exact agreement, trolley 192 passes onto an insulation strip which cuts out motor 12.

The distance from vehicle to destination is represented to scale by the distance along the center line of arcs 136 and 139 from the axis of sleeve 132 to that of arm 138. If these two axes were to be brought into coincidence, and arm 138 then moved into the point representing the point of destination, the amount by which arc 139 would slide over arc 136 during the movement of arm 138 from the first mentioned to the last mentioned position would be equal to this measure of the distance between the two points. I therefore provide for registering the distance by providing pinions 205 and 205a adapted to be rotated in proportion to the amount of such sliding, and so connected to dials 20 that the dials will registered zero when the axes of sleeve 132 and arm 138 come into coincidence, and will register the number of miles (or whatever other units it may be desired to use instead) represented by the distance which arm 138 may have moved from sleeve 132.

As described in the specifications covering my automatic steering device, that apparatus is especially well adapted for use on airplanes and other aircraft. As described in the specifications covering my latitude and longitude meter, that device is particularly adaptable for use with my automatic steering device, and my automatic navigator as covered in these specifications is designed to operate in conjunction with these two devices, so that the entire apparatus as used in conjunction is particularly adapted for use on airplanes and other aircraft. By using this combination of devices in conjunction with an automatic altitude control such as that covered by my copending application No. 209,061, filed July 28, 1927, and an automatic banking control such as that covered by my copending application No. 215,126, filed August 24, 1927, this automatic navigator can be used on an airplane with perfect ease and safety. These two last mentioned devices operate to automatically insure the longitudinal and transverse stability of the airplane, thereby rendering it thoroughly practicable to let the automatic navigator and its correlated devices take complete control of the airplane.

It will readily be understood however that the probable field of use for this device will by no means be limited to use on airplanes and other aircraft, but that the device may be used on any other type of dirigible vehicle, being well adapted for use on ships.

What I claim is:

1. In a dirigible vehicle the combination of a meter adapted to register in angular measure the latitude and longitude of the vehicle, a shaft rotated thereby in proportion to the algebraic change in latitude, and a shaft also rotated by said meter in proportion to the algebraic change in longitude.

2. In a navigator the combination of numeral dials adapted to register latitude, a dial adapted to indicate the hemisphere of the latitude registered, a hand operated member adapted to rotatably actuate the dials, a rotatable shaft actuated by said member, means adapted to change the indication of the dial indicating hemisphere whenever zero latitude is registered, and means actuated by said dial in changing its indication adapted to reverse the connection of the latitude dials to the hand operated member and rotatable shaft.

3. In a navigator the combination of rotatable dials adapted to register longitude, a hand operated member for positioning said dials, a rotatable shaft actuated by said member, a dial adapted to indicate the hemisphere of the longitude registered, means adapted to change the indication of said dial whenever the longitude dials register zero or the value corresponding to the maximum longitude of a hemisphere, and means actuated by such change to reverse the connection between the hand operated member and the longitude dials.

4. In a computing machine the combination of a member positioned with respect to the longitude of one point on the earth, another member positioned with respect to the longitude of another such point, and a member positioned by said two members at a position corresponding to the algebraic difference between said two longitudes.

5. In a navigator the combination of two members rotatable with respect to each other, two shafts positioned with their central axes coincident with the axis of such rotation, helical guides on said shafts, a member interlocking the helical guides, mechanism adapted to slide said member longitudinally on the helical guides and thereby alter the angular relation of the two shafts, and other helical guides rigid with the two members first mentioned and adapted to position said mechanism with respect to the angular relation assumed by said two members.

6. In a computing machine the combination of two members relatively rotatable, a helical guide rigid with one of said members, a helical guide of different rotational coefficient rigid with the other member, a pin interlocking said two guides and positioned by their intersection, another pin rotatable with respect to said first pin about the central axis of the helical guide, a guide rigid with the first pin for positioning the second pin in a direction perpendicular to the plane of its rotation, and a sleeve and shaft each having helical guides of differing rotational coefficient interlocked by said second pin.

7. In a navigator the combination of indicators adapted to be positioned with respect to the latitude and longitude of two points on the surface of the earth, two concentric, interlocked arcs, slidable with respect to each other and each pivoted to a radial axis, and means adapted to position said two axes to assume relative positions corresponding to the relative positions of the radii of the earth to the two points above mentioned.

8. In a vehicle the combination of an indicator adapted to register the longitude of the vehicle, an indicator adapted to register the longitude of a chosen point, a shaft adapted to be rotated in proportion to the change in the algebraic difference of said two longitudes, and a member adapted to be rotatably displaced by said shaft through an angle equal to the algebraic change in such difference.

9. In a navigator the combination of means for indicating a desired destination, a member adapted to be positioned at an angle corresponding to the latitude of the navigator, a support adapted to be rotatably positioned on an axis fixed with relation to said first named member at an angle corresponding to the difference between the longitude of the navigator and that of the destination, and an arm adapted to be positioned on an axis fixed with relation to said support at an angle corresponding to the latitude of the destination.

10. In a navigator the combination of a sleeve rotatable in fixed supports, a movable element adapted to be positioned from said sleeve at a distance and in a direction representing the distance and direction to a desired destination, a member rigid with said sleeve, and another member longitudinally slidable on said first named member and pivotally attached to the above mentioned element.

11. In a dirigible vehicle the combination of dials adapted to register the latitude and longitude of the vehicle, another set of dials adapted to register the latitude and longitude of a chosen destination, and mechanism positioned by both of said sets of dials in a manner adapted to indicate the course from the vehicle to the destination.

12. In a computing machine the combination of actuating means positioned in respect to the latitude of an initial point, actuating means positioned in respect to the latitude of a destination, actuating means positioned in respect to the difference between the longitude of the initial point and that of the destination, and mechanism adapted to be moved by said three actuating means into a position corresponding to the bearing of the course from the initial point to the destination.

13. In a navigator the combination of a sleeve rotatable in fixed supports, a movable element adapted to be positioned from said sleeve in a direction representing the direction to a desired destination, and a member rigid with said sleeve and actuated by said element in a manner adapted to rotatably position the sleeve to correspond to the course to the desired destination.

14. In a dirigible vehicle the combination of automatic steering means, a controller for setting the course to be steered, an indicator adapted to be positioned for the latitude of a desired destination, another indicator adapted to be positioned for the longitude of such destination, and means actuated by said indicators to position the controller for the course to said destination.

15. In a dirigible vehicle the combination of means adapted to register the latitude of the vehicle and separate means adapted to register the longitude of the vehicle, means adapted to register the latitude of the destination and separate means adapted to register the longitude of the destination, means for automatically steering the vehicle, including means for setting the course to be automatically followed, and mechanism connecting said four registering means to said course-setting means in a manner adapted to position the course-setting means for the course from the vehicle to the destination.

16. In a dirigible vehicle the combination of automatic steering means, a meter adapted to register the latitude and longitude of the vehicle, dials adapted to be positioned for the latitude and longitude of a desired destination, and means connecting said meter and indicators to the automatic steering means in a manner adapted to steer the vehicle along the great circle course to the destination.

17. In a dirigible vehicle the combination of a set of dials adapted to be set for the latitude of a chosen destination, another set of dials adapted to be set for the longitude thereof, a meter adapted to register the latitude and longitude of the vehicle, means actuated by said meter and sets of dials to automatically steer the vehicle upon the great circle course from its position to the destination, and means actuated by the meter to continuously alter the bearing of the course throughout the trip in a manner adapted to maintain the vehicle on the great circle course.

18. In a dirigible vehicle the combination of an indicator adapted to be set for the latitude of a chosen destination, another indicator adapted to be set for the longitude thereof, a meter adapted to register the latitude and longitude of the vehicle, a member positioned by said indicators and meter into a position corresponding to the course from the vehicle to the destination, and means actuated by said meter throughout the movement of said vehicle to reposition said member to the course from each successive position of the vehicle to the chosen destination.

19. In a dirigible vehicle the combination of a controller adapted to indicate a course and automatically steer the vehicle on the course indicated, a reversible motor adapted to position the controller, a member adapted to be rotatably positioned automatically with respect to the course to a desired destination and means adapted to position the controller to the same course, said means including electrically conductive members positioned respectively by said member and by the controller in a manner adapted to form contacts actuating the motor.

20. In a dirigible vehicle the combination of a controller adapted to steer the vehicle on a course fixed by the controller, a reversible motor adapted to position the controller, an electric trolley rotatably positioned by the controller to correspond to the course set thereon, two contact plates adapted to be rotatably positioned about the same axis with respect to the course to a desired destination and to selectively contact with the trolley, whenever the controller is set for other than said last mentioned course, in a manner adapted to actuate the motor and displace the controller toward its setting for said course.

21. In a dirigible vehicle the combination of automatic steering means, an indicator adapted to be positioned for a desired destination, mechanism positioned thereby in respect to the course from the vehicle to said destination, and a hand-operated member adapted to be positioned to either give said mechanism automatic control of the automatic steering means or to give the operator direct control of said means, as the operator may elect.

22. In a dirigible vehicle the combination of a controller adapted to be rotatably positioned to indicate course directions, means actuated by said controller to maintain the vehicle on the course indicated, another member adapted to be rotatably positioned to correspond to the course to a given destination, selective contacts actuated by said member and by the controller adapted to bring the controller to the course indicated by said member, and a hand operated switch in circuit with said contacts.

23. In a navigator the combination of four shafts adapted to be rotatably positioned to respectively correspond to the latitude and the longitude of each of two points, and a member positioned by said shafts to correspond to the distance between the two points.

24. In a computing machine the combination of actuating means positioned in respect to the latitude of an initial point, actuating means positioned in respect to the latitude of a destination actuating means positioned in respect to the difference between the longitude of the initial point and that of the destination, and mechanism adapted to be moved by said three actuating means into a position corresponding to the distance from the initial point to the destination.

25. In a vehicle the combination of a meter adapted to register the latitude and longitude of the vehicle, an indicator adapted to register the latitude and longitude of a chosen destination, two members slidably displaced from their zero position in respect to each other by an amount corresponding to the distance from the vehicle to the destination, and a shaft rotated by such displacement in proportion to such amount.

26. In a navigator the combination of indicators adapted to register the latitude and longitude of two points, two members slidably positioned by said indicators to correspond to the distance between said two points, a rack bar rigid with one member, a threaded shaft and a pinion rigid therewith rotatable on an axis fixed with relation to the other member, a sleeve threaded to mesh with said shaft, and a guide adapted to prevent said sleeve from rotating with respect to said last named member.

27. In a navigator the combination of four indicators adapted to register respectively the latitude and the longitude of each of two points on the earth's surface, two arcs slidable upon each other positioned by said indicators, a threaded shaft rotated by the relative motion of said arcs in proportion to the change in distance between the two points registered on the indicators, a sleeve moved longitudinally by said shaft in the same proportion, and a rack bar rotatably attached to the sleeve.

28. In a navigator the combination of two members slidable with respect to each other over a limited range of movement, two pinions rotatable upon axes fixed with relation to one of said members, a rack bar rigid with the other of said members and meshing with one or the other of said pinions in each of the relative positions said members may assume within the limited range of movement above mentioned, and mechanism connecting said two pinions in a manner adapted to maintain equal rotation of the two pinions.

29. In a vehicle the combination of an indicator adapted to register the latitude and longitude of a desired destination, a shaft adapted to be rotated in proportion to the change in distance from the vehicle to the destination registered, and numeral dials actuated thereby to register the distance from the vehicle to the destination.

30. In a vehicle the combination of a destination indicator, two arcs adapted to be slidably displaced with reference to each other by an amount corresponding to the distance from the vehicle to the destination registered on the indicator, a rack bar moved longitudinally in proportion to such displacement, a pinion meshing with said bar, numeral dials adapted to register distance, and mechanism connecting the pinion to the numeral dials so as to produce a change of registration of said dials proportional to the rotation of said pinion.

31. In a navigator the combination of a latitude and longitude meter, a destination indicator, and mechanism positioned by said meter and indicator so as to register on suitable dials the course and distance from the point whose latitude and longitude is registered on the meter to the destination set on the indicator.

32. In a dirigible vehicle a member adapted to be moved in proportion to the change of longitude of the vehicle, another member adapted to be moved in proportion to the change in longitude of the destination south, and a member adapted to be moved in proportion to the change in algebraic difference between said two longitudes.

33. In a navigational device the combination of a rotatably supported member, a movable element adapted to be positioned from said member at a distance and in a direction representing the distance and direction from one point on the earth to another, and an arc rigid with the first mentioned member and adapted to be positioned by the element.

34. In a craft the combination of an indicator adapted to register the latitude of the vehicle, a separate indicator adapted to register the longitude thereof, an indicator adapted to register the latitude of a chosen destination, another indicator adapted to register the longitude thereof, and mechanism positioned by the four indicators in a manner adapted to indicate the distance from the craft to the destination.

35. In a navigational device the combination of rotatable dials adapted to register latitude, a shaft constrained to rotate in proportion to change of dial registration, and means automatically operative when zero latitude is registered to reverse the direction of rotation of the shaft with respect to that of the latitude dials.

36. In a navigational device the combination of dials adapted to register longitude, a member adapted to be moved in proportion to the change of registration of the dials, and means adapted to be automatically actuated at predetermined dial registrations for reversing the direction of movement of the member relative to that of the dials.

37. In a register two sets of dials, each set adapted to register longitude, and a member adapted to be automatically brought to a position corresponding to the algebraic difference between the two longitudes registered.

38. In a device of the class described two longitude indicators, means in conjunction with each for changing the longitude indicated, a differential member actuated by both of said means, and an element moved by said differential member in proportion to the change in the algebraic difference of the longitudes registered by the two indicators.

39. In a device of the class described a member pivotally supported relative to an axis, a second member pivotally supported relative to another axis, an indicator, and means for transmitting to the indicator a registration proportional to the distance between the pivotal centers of the two pivotally supported members.

40. In a vehicle the combination of a member settable with respect to course, means controlled thereby for steering the vehicle on the course set, indicators for registering the position and the destination of the vehicle, an element positioned thereby to correspond to the course to destination, and means controlled by the element for positioning the settable member to the course to destination.

41. In a vehicle the combination of a member adapted to be positioned to indicate course, means for automatically steering the vehicle on the course indicated, an element and means to position said element with respect to course, and means controlled by the element for positioning the indicating member to the course for which the element is set.

42. In a vehicle automatic steering mechanism, manual means for setting the controlling course therefor, automatic means for setting the controlling course therefor, and a member for optionally rendering either course setting means operative and the other inoperative.

43. In a vehicle automatic steering means, automatic means for setting the controlling course therefor, and a member for optionally rendering said course setting means inoperative.

In testimony whereof I affix my signature.
HAROLD T. AVERY.